United States Patent [19]

Schneider et al.

[11] Patent Number: 5,122,281

[45] Date of Patent: Jun. 16, 1992

[54] FILTER AID AND METHOD FOR USING SAME FOR RECLAIMING OIL COOLANTS USED FOR METAL WORKING

[75] Inventors: John R. Schneider, Belvedere, Calif.; John O. McLean, Richmond, Va.

[73] Assignee: J. R. Schneider Co., Inc., Benicia, Calif.

[21] Appl. No.: 790,587

[22] Filed: Nov. 8, 1991

[51] Int. Cl.⁵ .............................................. B01D 37/02
[52] U.S. Cl. .................................... 210/749; 210/767; 210/501; 210/504; 210/508
[58] Field of Search ............... 210/679, 749, 767, 807, 210/777, 502.1, 501, 506-509, 504; 422/56

[56] References Cited

U.S. PATENT DOCUMENTS 4,847,196  7/1989  Geisler et al. ........................ 422/56

*Primary Examiner*—Frank Sever
*Attorney, Agent, or Firm*—Owen, Wickersham & Erickson

[57] ABSTRACT

A filter aid material and a method for using same in a filtration system for reclaiming and maintaining coolant oil used in aluminum rolling or working processes are disclosed. The filter aid is a fibrous material which is permeated with an acid material and may be provided in either particulate form as a body feed or as a compressed filter pad. As contaminated oil flows through the filter aid, the acid acts chemically to remove aluminum fines and oxides as well as the aluminum portion of contaminating soap in the coolant oil. Use of the filter aid with acid greatly reduces the amount of conventional filter aid previously used and produces a relatively small amount of residual filter aid which can be disposed of by incineration.

7 Claims, No Drawings

FILTER AID AND METHOD FOR USING SAME FOR RECLAIMING OIL COOLANTS USED FOR METAL WORKING

This invention relates to the purification or reclamation of lubricants and more particularly to an improved method for reclaiming lubricants used in working processes for light metals such as aluminum, so that such lubricants can be recycled and reused in such processes.

BACKGROUND OF THE INVENTION

During the working of aluminum such as in rolling mills, light mineral oils are often used, and to further improve metal surface quality and control the shape (flatness) of the sheet during the working process, certain additives are blended with the mineral oil. These additives usually consist of organic materials such as aliphatic acids, esters of aliphatic alcohols and aliphatic acids, aliphatic alcohols and many natural oils such as palm and coconut oils.

As the metal passes through the rolling mill rolls, it is reduced in thickness. During this process, oxides, already present on the entering metal are broken into tiny particles and enter the rolling lubricant. In addition, fresh metal particles or fines are formed by contact of the fresh metal with the rolls as well as by the gouging of the fresh metal with the hard oxide particles.

During the rolling process, the additive materials are gradually consumed through oxidation and by reaction with the metals. The mineral oil itself may slowly oxidize. Fresh oxide free metal is extremely active and is normally formed in the roll nip as the metal is reduced in thickness. Thus, the metal surface reacts with the additive material to form organic soaps-salts of the metal and organic acids. These soaps are very undesirable materials in that they tend to cling to the metal and cause surface defects as the metal undergoes further reduction in succeeding passes through the mill. Enormous sums of money have been spent by the industry in attempts to remove or minimize the amount of these soaps. Heretofore, the most common method for controlling soap and removing it from the coolant oil has been by filtration through a mixture of Fullers earth and diatomaceous earth, which are also used to filter particles of metal and metal oxide.

Because of environmental considerations, it has become increasingly difficult to dispose of the enormous quantities of used mixtures of earths since such mixtures contain small amounts of oil and additives. It is likely that in the near future, disposal of such quantities of untreated earth generated each day by the industry will be entirely prohibited. To solve this critical problem, a considerable effort has been made to develop a more satisfactory method of cleaning up used metal working lubricants.

In the prior art Riesmeyer (U.S. Pat. No. 2,339,520) disclosed an early attempt to accomplish this clean up process by treatment of the oils with concentrated sulfuric acid in an amount of 85% of the stoichiometric quantity required to react with all of the aluminum and its oxide.

However, it was found that concentrated sulfuric acid, a very potent material, when used with coolant oil such as a vegetable or mineral oil formed almost immediately a brownish, red sludge. Many other oils behaved similarly. This required a further complicated procedure involving separation of the sludge from the treated oil and ultimately disposal of the sludge material. Also the reaction produced in Riesmeyers' treatment caused the removal of beneficial additive materials from the coolant oil, because concentrated sulfuric acid inherently tends to attack numerous organic compounds. For the aforesaid reasons and also the fact that concentrated sulfuric acid is a dangerous material for production workers to handle, the Riesmeyer method proved to be impractical for actual use.

It is therefore a general object of the present invention to provide an improved process for filtering or reclaiming coolant oil used during the working of aluminum which will effectively remove contaminants such as aluminum fines, oxides and soaps from the oils.

Another object of the invention is to provide a process for reclaiming contaminated coolant oil which produces used filtration media that is non-toxic and can be disposed of without expensive labor intensive procedures.

SUMMARY OF THE INVENTION

In filtering systems where a large flow rate of contaminated coolant oil must be accommodated (e.g. above 50 gallons per minute), filter aid materials are normally used to form a cake for filtering the used or contaminated coolant oil. Heretofore, the most commonly used filter aid materials were diatomaceous earth and Fullers earth typically used in a 50—50 mixture which physically filtered out particles in the contaminated cooling oil. The Fullers earth also works as an adsorbent. In accordance with the present invention, a new filter aid material is provided by mixing a selected acid material with a fibrous filter aid material before it is used in the filtering process to provide a unique cleansing action on the coolant oil. The acid material is sprayed or otherwise applied to a filter media such as a fibrous cellulose material formed from wood chips so that when the filter media is later used in a filter system capable of handling large flow rates, the liquid dirty oil passing through the filter media is exposed to the acid which acts upon it to remove metal fines, oxides and soaps. The filter media and the acid materials are selected so that after the completion of a filtration cycle, the accumulated filter cake can be easily and safely disposed of by simple incineration without any problems of toxic material disposal.

Other objects, advantages and features of the invention will become apparent from the following detailed description of embodiments thereof, including examples of actual test runs.

DETAILED DESCRIPTION OF INVENTION

Coolant oil used in aluminum working or rolling processes has a black murky appearance in its dirty state and a significant ash content due to the presence of metal fines, oxides and soaps. Basically, such coolant oil is a light mineral oil which may be about 40 SSU at 100° F. viscosity. Also, certain additives usually in the form of high molecular weight acids (such as oleic acid), and/or esters (such as butylstearate) are put into the clean coolant oil to enhance the quality of the finished, rolled metal product.

In the implementation of the coolant oil cleaning method according to the present invention, a suitable filtering apparatus is utilized such as described in U.S. Pat. No. 3,608,734. In such an apparatus the dirty coolant oil, after being used in the metal working or rolling process, is furnished to an input chamber located on the upper side of a filter sheet (e.g. filter paper) supporting a cake of filter media. The coolant oil passes through the filter media and sheet to a collection chamber below the filter sheet. Contaminants in the coolant oil are collected in the cake on the filter sheet and clean oil is accumulated in a chamber below the sheet. Before and during the filtering process, a filter aid material (e.g. formerly diatomaceous earth and Fullers earth) is added to the dirty coolant oil to build up the cake on the filter sheet to enhance the filtering process.

In accordance with the present invention, the filter aid material such as diatomaceous earth and Fullers earth formerly used, are replaced by a different, unique filter aid material which is activated with an acid. Thus, during a filtering cycle, the acid in the filter aid functions to convert the aluminum fines and aluminum oxide that contaminated the coolant to an aluminum salt of the acid present. This conversion removes the aluminum and aluminum oxide from the coolant because the salt is quickly removed by the fibrous carrier portion of the filter aid. The acid also converts the contaminating aluminum soap in the coolant to a residue compound which is substantially identical to the additive from which the soap was formed. This residue dissolves in the coolant and passes through the filter cake, thereby returning the additive material that was previously in the soap, back to the clean rolling oil coolant.

The present invention consists of activating or treating a readily available filter aid with an acid solution and thereafter using the activated filter aid in a conventional filtering system. The filter aid acts only as a carrier, holding the acid within itself, preventing the acid from going into the oil system, but allowing the oil to be treated by temporary contact with the acid. Filter aids tested in the development of this invention include diatomaceous earth, pearlite, rice hulls, a by-product from the coking process in an oil refinery, cotton and processed wood pulp material. All of these materials are commercially available. It was found that a cotton material held the most acid per pound, however, it was more expensive than wood pulp which held almost as much acid per pound. All of the above filter aid materials worked in the tests made to provide a filtering media and carrier for the acid. However, the wood pulp material proved to be the most economical choice. All of the filter aids tested, except the cotton and the wood pulp, when incinerated after filtering cycles tend to maintain their bulk and weight which have to be disposed of in a land fill. The cotton and the wood pulp materials, when incinerated, reduced down to less than 1% of their original bulk and weight, thereby reducing considerably the bulk of material that must be sent to the land fill.

The method of activating the various filter aid materials tested was to spray or wash the filter aid with a weak solution of acid. In an initial test, different concentrations of sulfuric acid from 2% to 25% sulfuric acid were tested. Laboratory filtering tests providing good oil cleanup results were experienced with all concentrations between 2% and 25%. Concentrations above 25% worked well, but are potentially more corrosive with the filtering apparatus and more dangerous to work with. A 10% solution of sulfuric acid was found to be a safe concentration to work with, and to be safer and less corrosive than a higher concentration. Concentrations of sulfuric acid above 50% tended to attack and destroy the additives in the coolant oil causing them to end up as a dark sludge that required a separate disposal procedure. Also, concentrations above 50% had a tendency to burn the wood pulp.

Further tests were conducted using other acids. The acids tested were acetic acid, citric acid, oxalic acid, hydrochloric acid and sulfuric acid. All of these acids were mixed well with the wood pulp which was then used in a laboratory test setup to clean a measured amount of contaminated coolant oil. All of the acids tested did a satisfactory job of cleaning the dirty coolant. Tests proved that pound for pound sulfuric acid removed more contaminants from the coolant than any of the other acids tested. However, as all of the acids tested did a satisfactory job, it was decided to further test a less corrosive acid and compare the results with the common method being used today by the aluminum industry, that is the diatomaceous earth and Fullers earth treatment. The coolant oil problem to which this invention relates is most prevalent in plants for manufacturing aluminum foil. Because aluminum foil is used in the food industry to wrap food for protection it was decided to test citric acid. This acid is FDA approved and is much less corrosive than sulfuric acid.

When the contaminated coolant oil flows into the filter aid material containing acid, such as citric acid, essentially three chemical reactions take place.

First of all the citric acid in the filter aid acts on the aluminum fines in the coolant to produce the following reaction: Citric acid and Aluminum yields Aluminum Citrate and Hydrogen.

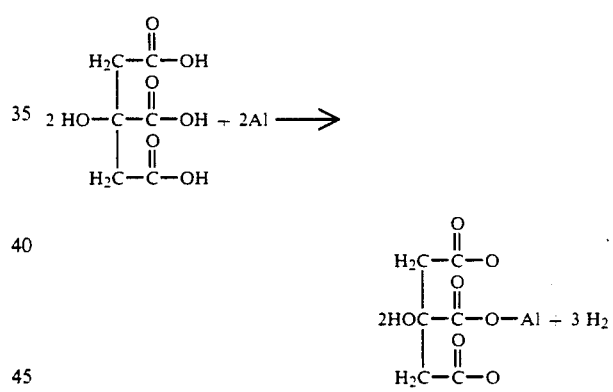

Secondly, the acid reacts with the aluminum oxide as follows; Citric acid and Aluminum Oxide yields Aluminum Citrate and water.

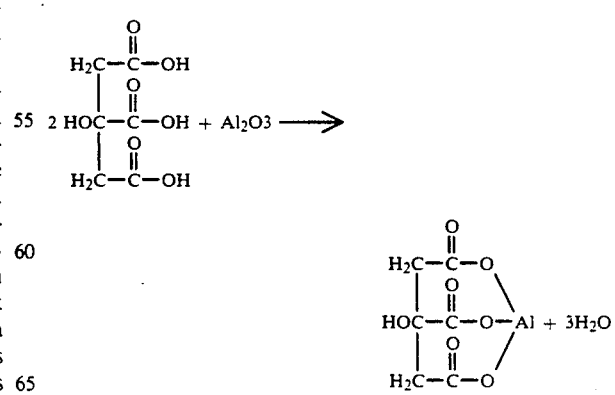

Thirdly, the acid reacts with the soap (aluminum stearate) in the contaminated coolant to provide the following reaction: Citric acid and Aluminum stearate yields Aluminum Citrate and Stearic acid.

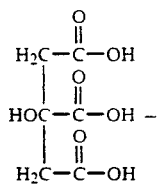

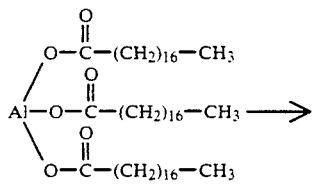

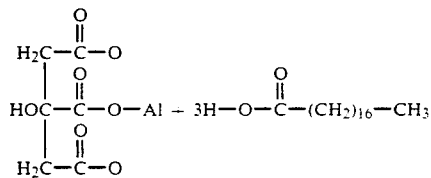

As the aforesaid reactions take place, the components produced by the various reactions are disposed of as follows: The salt, aluminum citrate and water remain in the filter cake or pad for eventual disposal, and the stearic acid is recombined with the filtered coolant oil for return to its supply container.

Following is a resume of laboratory tests which were conducted to measure the oil cleansing power of the present invention. The Examples 1 and 2 served to provide a comparison between the cleansing power of citric acid activated filter material and the prior art filtering procedure using earth materials on typical contaminated coolant oil.

Example 1

A solution of 50%, by weight, of powdered citric acid and 50% by weight of water was made up. Two mls of this solution was mixed into twelve grams of wood pulp. This material was then used as a filter material to filter 800 mls of dirty coolant having an initial total ash of 0.015%. The 800 mls of dirty coolant was than filtered through the treated wood pulp for two hours. Using conventional ash content assay procedures, the total ash content of the coolant, after the two hours of filtering was 0.000% by weight. The coolant was bright and clear.

Example 2

As previously stated, the conventional method of cleaning coolant in an aluminum mill is to filter the coolant through a mix, consisting of 50% diatomaceous earth and 50% Fullers earth. To make a comparison of the ash removing ability of the acid treated wood pulp to the diatomaceous/Fullers earth treatment used today in the aluminum industry, a mix of 12 grams of diatomaceous earth and 12 grams of Fullers earth was made up. Through this mixture, 800 mls of dirty coolant, having a total ash of 0.015%, was filtered for two hours. The ash content of the coolant, after filtering, was 0.009%. The acid treated wood pulp, (Example 1) pound for pound, did a better cleaning job.

In testing the fibrous filter aid activated with acid, a new phenomenon was discovered to be taking place during the filtration process. When citric acid, in an aqueous solution, is mixed with wood pulp, the wood pulp soaks the acid laden liquid up by absorption. Each little piece of pulp has acid solution soaked into it in the same manner that a very small sponge would hold liquid. This ability of the wood pulp fibers to absorb and hold the acid prevents the acid from coming out and becoming part of the coolant oil during the filtration process. Also, because the acid is not soluble in oil it does not dissolve into the oil, so the acid stays in the wood pulp. When the aluminum laden coolant comes in contact with the acid in the wood pulp, a chemical action takes place. This is not a dissolving action but a chemical reaction between the aluminum and the acid as previously described. When the aluminum in the coolant oil comes in contact with an acid, the acid converts to an aluminum salt of the acid present. In the case of aluminum fines coming in contact with citric acid, the acid converts to aluminum citrate, an aluminum salt, not soluble in the coolant oil, and because the velocity of the coolant through the wood pulp filter cake is very slow, (not over 0.005 feet per second), the aluminum citrate stays in the wood pulp and does not go into the coolant oil.

With regard to the aluminum soap in the contaminated coolant oil, the acid in the wood pulp works in a similar way. When the aluminum soap comes in contact with the acid in the wood pulp, the aluminum part of the soap is converted to an aluminum salt of the acid present, as in the solid aluminum fines conversion. The compound left after this conversion is a compound (e.g. stearic acid) substantially identical to the additive from which the soap was formed. This action returns the additive material, that once was tied up in the soap, back into the rolling oil coolant for reuse.

As the oil cleaning process continues, the acid soaked into the wood pulp slowly diminishes as it converts the aluminum fines, aluminum oxide and soap which come in contact with it to an aluminum salt. In time, all of the acid is converted to the aluminum salt. No more reaction takes place between the aluminum fines and the acid because there is no more acid left to react. At this time the filter cake must be removed from the filter and a new cake of wood pulp and acid formed in the filter. This action is referred to, in the filter field, as recycling the filter. If the filter is not cycled at this time the coolant will start to get dirty and its ash content will go up.

The more acid solution present, in the wood pulp cake, the longer the time span between filter recycling. However, if the amount of acid present in the wood pulp cake is excessive, some of the acid solution will wash off into the coolant oil. It will not be in a dissolved state, but in a physical state. It could be moved along with the coolant oil and finally settle out in a low spot in the system and, in time, cause corrosion.

Tests were conducted to determine a safe quantity of acid to filter aid ratios. The wood pulp fibers and the cotton fibers can safely hold their own weight in liquid and not sluff off liquid into the coolant oil. The other filter aids, previously mentioned in this report, safely held much less liquid. This fact makes the wood pulp the best choice to use as a carrier for the acid.

As stated, different acids were tested to determine the best and safest acid to use. Five acids tested were Sulfuric, Hydrochloric, Citric, Oxalic and Adipic Acid. Other acids which could be used in implementing the present invention include glycolic, lactic, malic, tartaric, and glyoxylic acid.

Examples 3-7

In the following tests for all acids one gallon of dirty roll or contaminated coolant from an operating aluminum rolling mill was collected. The total ash content of this dirty roll coolant oil was measured, by the standard ASTM ash test procedure. The total ash of this contaminated coolant oil was 0.077% by weight. This coolant was labeled as the standard control coolant for the following tests.

In each of the test examples, 3-7, a quantity of 200 mls of the standard control coolant was first put in a 600 ml beaker. The beaker was then placed on a heatable, magnetic stirrer. In all of the following test examples, the filter aid material used was a wood pulp fiber material produced by the Cellulo Company of California. For each test, the acid used was mixed thoroughly with the wood pulp filter aid. In the first test, five grams of a wood pulp filter aid having five grams of sulfuric acid, of a 10% concentration, was added to and thoroughly mixed into the control coolant. The coolant with the acid treated wood pulp was then vigorously stirred and brought up to 140° F. The stirring action was continued for one hour. The beaker was removed from the stirrer. The contents was allowed to cool and settle at the bottom of the beaker. The oil above the settled material was clear and an ash test was performed on the coolant. All five acids combined with the filter aid were tested using the same test procedure. The resulting ash readings of the clear coolant produced are listed below.

| Ex. #3 | Sulfuric acid of 10% strength. | Ash .000% |
| Ex. #4 | Hydrochloric acid 10% strength. | Ash .000% |
| Ex. #5 | Citric acid 50% strength. | Ash .002% |
| Ex. #6 | Oxalic acid 10% strength. | Ash .000% |
| Ex. #7 | Adipic acid 2% strength. | Ash .035% |

From the above it can be seen that both mineral and organic acids removed ash from an aluminum rolling coolant. In the case of the Adipic acid, because of its inferior strength, the coolant did not clean up well. The remaining acids did a spectacular job of removing contaminants from the oil.

Sulfuric and Hydrochloric acid which are mineral acids, performed well, but they are harsh in nature and quite corrosive. The organic acids (citric, oxalic and adipic) are less hazardous to use and also did a good job of cleaning the coolant. Citric acid has FDA approval which makes it attractive when rolling aluminum foil which is to be used in the food industry.

Following the aforesaid laboratory tests, a full scale test in an actual operating aluminum foil plant was arranged. In this on site test, ten 50 pound bags of wood pulp combined with citric acid were prepared and supplied to the aluminum foil facility. In this test a 50—50 acid solution was formed by adding an equal weight of water to pure crystalline citric acid. Then, one gallon of the liquid acid solution was mixed with each 50 lb. bag of wood pulp material. The filter servicing this small foil rolling mill, chosen for the test, normally required 100 lbs. of Fullers earth and 100 lbs. of diatomaceous earth each 24 hour day to process contaminated coolant oil and maintain an ash level of 0.004% to 0.005%. Records of this plant had shown that even increase the maximum charge to 200 lbs. of material per day could not lower the ash content in their coolant below 0.004% to 0.005%. In the tests performed, using 100 lbs. of the acid treated wood pulp according to the present invention in lieu of diatomaceous and Fullers earth, a significant improvement in coolant oil treatment was observed in that an ash content of 0.000% to 0.001% was maintained for the contaminated coolant oil treated in a normal 24 hour period. The remarkable results of this full scale test proved that the acid treated wood pulp removed more ash, pound for pound, than the conventional method of a diatomaceous/Fullers earth treatment and also proved that what was accomplished in the lab could also be accomplished on a full scale aluminum mill.

It was determined, both in the lab and on the full scale rolling mill test, that the quantity of acid used in the wood pulp determines the quantity of ash removed from the coolant.

Different quantities of acid per lb. of wood pulp were tested to see if more ash could be removed with a fixed quantity of wood pulp. It was discovered that as the quantity of acid per lb. of wood pulp was increased, the ash removal ability was also increased. Tests have determined that the wood pulp filter aid can absorb its own weight in acid and still function as a filter cake, and therefore an efficient mix to use is one lb. of wood pulp to one lb. of acid. At this concentration of acid, five times as much ash can be removed than with a wood pulp to acid concentration or one lb. of acid to five lb. of wood pulp. With the higher acid concentration, more ash can be removed per lb. of wood pulp, so less wood pulp is needed to do the job and less wood pulp must be disposed of each day.

As stated previously, most coolant filters in the filter industry are designed to utilize a particulate filter aid or "body feed" such as diatomaceous earth, or the wood pulp material of the present invention which is fed into the filter to build the filter cake. The mechanism, on the filter, that injects the body feed into the filter is called the body feed system. Some filters do not have a body feed system for particulate body feed but instead use a thick sheet or thick pad of filter material to do the filtering rather than a cake. Such preformed, pressed filter material in the form of cut sheets may be inserted between the filter plates by hand, or the thick sheet can be provided in the form of a continuous roll that is pulled into the filter automatically when the filter is recycled. The preformed filter sheets or pads may be made of pressed wood chips, cotton fibers or chemical fibers such as polypropylene, nylon or polyester.

For filters using such thick filter sheets or pads instead of a filter cake, the acid can be sprayed on the pad as it is formed in much the same manner that acid is mixed together with particulate filter material. The pad soaks up the acid much like a blotter would soak up ink. When the dirty coolant oil flows through the acid treated blotter like pad, the acid performs the same function as it would when flowing through a filter cake. Thus, the present invention works well on both a filter using a thick filter cake or a filter using filter pads in a cut sheet or roll configuration.

As stated, a significant advantage provided by the present invention is derived from the fact that the acid depleted wood pulp or filter pad can be incinerated with an environmentally acceptable incinerator. When using citric acid in the wood pulp or filter pad, the pollution from the incinerator is only $CO_2$ plus a trace of aluminum oxide. Thus, the present invention eliminates the problem of disposing of tons of hazardous waste each day. For example, a medium size aluminum rolling mill requires 400 lbs. of diatomaceous earth and Fullers earth each day to keep the coolant in a useable condition. This used cake material is contaminated with oil and becomes a hazardous waste to be disposed of in a hazardous waste dump. There are over 250 aluminum rolling mills creating about 50 tons of hazardous waste each day in the USA alone. When these 250 rolling mills convert to the new technology of the present invention, there will be less then 50 lbs. of wood pulp to dispose of per mill each day. The wood pulp incinerates down to less than 2% of its original weight or about 1 lb. of non-hazardous waste each day per mill. This reduces the total material to dispose of each day in the USA, from 50 tons of hazardous waste to about 250 lbs. of non-hazardous wood pulp ash. In a typical prior art filter system employing diatomaceous earth and Fullers earth to clean the coolant, the filter had to be cycled, (cleaned), each 24 hours. This required labor to cycle the filter, and more labor to remove the large quantity of spent earth (filter cake), and then put new filter aid into the filter. Because the activated wood pulp is five times more effective than the diatomaceous earth/Fullers earth mixture, the filter will run five times longer before requiring the filter cycling operation. Thus, using this new technology, the filter will operate for five to six days before it has to be cycled, thereby saving considerable labor.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A method for removing aluminum fines, aluminum oxide particles, soaps of aluminum and other deleterious material from contaminated coolant oil used in an aluminum working operation, said method comprising:
   providing a fibrous filter material;
   supplying an acid solution to said filter material so that it is substantially uniformly permeated therein;
   passing a flow of the contaminated coolant oil through said acid-permeated filter material so that the acid therein can chemically, remove said aluminum fines and oxides from the contaminated coolant oil; and
   collecting purified coolant oil free of contaminants from said filter material.

2. The method as described in claim 1 wherein said fibrous filter material is in a particulate form when it is mixed with said acid solution and including the step of providing a supporting filter sheet in the flow path of the contaminated coolant for retaining the filter material in a cake-like form on said filter sheet.

3. The method as described in claim 1 wherein said fibrous filter material permeated with said acid solution is in the form of a compressed pad which is located in the flow path of the contaminated coolant oil.

4. The method as described in claims 1, 2 or 3 wherein said filter material is comprised of wood pulp fibers.

5. The method as described in claims 1, 2 or 3 wherein said acid solution is citric acid.

6. The method as described in claims 1, 2 or 3 wherein said acid solution is oxalic acid.

7. The method as described in claims 1, 2 or 3 wherein said acid solution is sulfuric acid.

* * * * *